May 16, 1933.  H. G. CARLSON  1,909,754
HAND RAKE
Filed Jan. 26, 1932
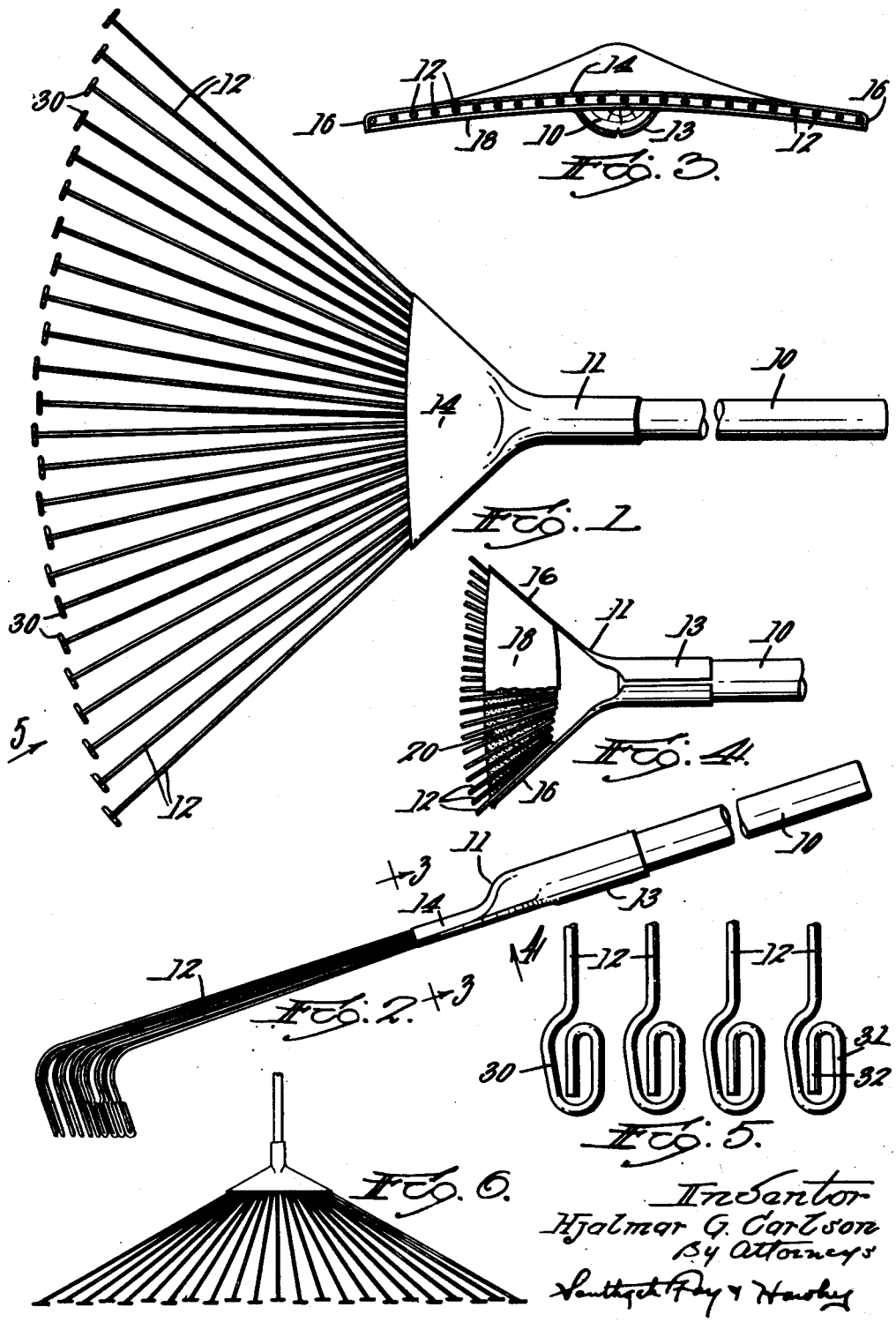

Patented May 16, 1933

1,909,754

UNITED STATES PATENT OFFICE

HJALMAR G. CARLSON, OF SHREWSBURY, MASSACHUSETTS

HAND RAKE

Application filed January 26, 1932. Serial No. 588,921.

This invention relates to a hand rake, particularly intended for garden or lawn use.

It is the general object of my invention to provide a hand rake for such purposes which is of an improved construction and which possesses important advantages in use and operation.

One feature of the invention relates to the provision of a hand rake in which the tines are each of unit wire construction, with the free ends of the tines so formed as to be specially adapted to their intended purposes.

Another feature of the invention relates to the provision of wire members or tines so arranged that the free ends thereof are staggered, permitting adjacent ends to overlap when vibrated or displaced laterally.

I also provide a rake of increased flexibility, as the wire members or tines are entirely free from each other throughout their length and may be vibrated freely for cleaning purposes.

My invention further relates to arrangements and combinations of parts which will be hereinafter described and more particularly pointed out in the appended claims.

A preferred form of the invention is shown in the drawing, in which

Fig. 1 is a plan view of my improved rake;

Fig. 2 is a side elevation thereof;

Fig. 3 is a sectional end elevation, taken along the line 3—3 in Fig. 2;

Fig. 4 is a detail bottom view, looking in the direction of the arrow 4 in Fig. 2;

Fig. 5 is an enlarged detail end elevation of certain of the wire members or tines, looking in the direction of the arrow 5 in Fig. 1, and Fig. 6 is a plan view of a modification.

Referring to the drawing, my improved rake comprises a handle 10, a head 11 and a plurality of wire members or tines 12. The handle 10 may be of wood or any other suitable material. The head 11 is preferably formed of sheet metal, with a portion 13 bent up to form a socket for the handle 10, and with a laterally expanded and slightly arched plate portion 14 covering the inner ends of the tines 12. The edges of the arched portion 14 are preferably bent downward, as indicated at 16, to definitely position the outer wire members or tines 12, and an arched plate 18 commonly underlies the members 12.

The parts 12, 14 and 18 may be secured together in any suitable or convenient manner, such as dipping the assembled parts into a bath of tin or some soldering alloy, which will fill all of the spaces around the wire members 12, as indicated at 20 in Fig. 4, and will thus firmly retain the parts in definite assembled relation. The members 14 and 18 may also be secured to each other by spot welding along their flat faces or edge portions if desired.

When the parts are secured by immersion in a metal bath, the tin or alloy also coats the tines 12 and the head 11 and preserves them from rust and corrosion.

The outer ends of the wire members or tines 12 are downwardly curved or offset, as indicated in Fig. 2, and the ground-engaging end portions 30 thereof are preferably bent to the outline indicated in Fig. 5. The extreme end portions of the wire members or tines 12 are bent upward as indicated at 31 and again downward as indicated at 32.

This peculiar construction of the ground-engaging end portions 30 of the tines is of particular importance and possesses marked advantages. In the first place, the end portions 30 are of substantial width, so that they somewhat closely approach each other when in normal position and form a fairly continuous surface against which grass or leaves or other waste material may be collected. Furthermore, the extreme ends 32 of the wires are protected at both sides, so that these sharp ends are shielded from accidental engagement with the person or clothing of the user.

When the rake is particularly intended for garden purposes, the wire members or tines 12 are preferably arranged in the fan-shaped relation indicated in Fig. 1. It will be noted, however, that the down-turned end portions 30 are not arranged in a continuous curve but are slightly staggered, so that when one of the end portions 30 is moved sidewise, it overlaps the end portions 30 of adjacent tines 12. In this way increased lateral vibration is permitted and the rake is made substantially self-cleaning by merely vibrating the tines 12. The effectiveness of this action is increased by the fact that the tines 12 are entirely unconfined except in the head 11.

The arched construction of the plate portion 14 of the head 11 disposes the wire members 12 in such relation that their ends 30 lie substantially in a horizontal plane when the handle is elevated at the ordinary working inclination, as clearly shown in Fig. 2.

If the rake is to be used for very light work, such as collecting lawn clippings, it is preferably formed in the shape shown in Fig. 6, with the ends of the wire members 12 disposed substantially in a straight line, instead of curved as shown in Fig. 1, and with the extreme width of the rake increased so as to cover a wider lawn surface. Otherwise the construction is as previously shown.

The wire members 12 are preferably made of good quality spring wire which has been suitably heat-treated.

Having thus described my invention and the advantages thereof, I do not wish to be limited to the details herein disclosed, otherwise than as set forth in the claims, but what I claim is:—

1. A hand rake comprising a handle, a head, and a plurality of elongated wire members secured thereto and extending in fan-shaped relation therefrom, said wire members having down-turned integral ground-engaging end portions, and each end portion being bent downward and then upward to form an open loop with the sides thereof substantially spaced apart, each loop being at least as wide as the space between adjacent loops.

2. A hand rake comprising a handle, a head, and a plurality of elongated wire members secured thereto and extending in fan-shaped relation therefrom, said wire members having down-turned integral ground-engaging end portions, and each end portion being bent downward and then upward to form a loop and having the extreme end of the wire bent again downward between the sides of the loop and protected from engagement thereby.

In testimony whereof I have hereunto affixed my signature.

HJALMAR G. CARLSON.